United States Patent
Hahn

(10) Patent No.: US 11,577,655 B2
(45) Date of Patent: Feb. 14, 2023

(54) FLEXIBLE SHELF GUARD FOR RECREATIONAL VEHICLES

(71) Applicant: John Joseph Hahn, Hartford, WI (US)

(72) Inventor: John Joseph Hahn, Hartford, WI (US)

(73) Assignee: John J. Hahn, Hartford, WI (US)

( * ) Notice: Subject to any disclaimer, the term of this patent is extended or adjusted under 35 U.S.C. 154(b) by 277 days.

(21) Appl. No.: 16/891,188

(22) Filed: Jun. 3, 2020

(65) Prior Publication Data

US 2021/0380041 A1 Dec. 9, 2021

(51) Int. Cl.
- *B60R 7/04* (2006.01)
- *A47B 97/00* (2006.01)
- *B29C 45/16* (2006.01)
- *B29K 21/00* (2006.01)
- *B29L 31/30* (2006.01)
- *B29K 23/00* (2006.01)

(52) U.S. Cl.
CPC ............... *B60R 7/04* (2013.01); *A47B 97/00* (2013.01); *B29C 45/1676* (2013.01); *B29K 2021/003* (2013.01); *B29K 2023/12* (2013.01); *B29L 2031/3005* (2013.01)

(58) Field of Classification Search
CPC .. B60R 7/04; B60R 7/005; B60R 7/08; A47B 97/00; B29C 45/1676; B29K 2021/003; B29K 2023/12; B29L 2031/3005
USPC ...... 296/37.8; 211/183, 180, 86; 108/61, 27; 312/140.4, 137, 348.3
See application file for complete search history.

(56) References Cited

U.S. PATENT DOCUMENTS

| | | | | |
|---|---|---|---|---|
| 2,547,883 A | * | 4/1951 | Olson | B60R 7/08 108/45 |
| 4,577,751 A | * | 3/1986 | St-Jacques | A47K 5/05 D6/540 |
| 5,601,198 A | * | 2/1997 | Reed | A47B 97/00 211/183 |
| D431,403 S | | 10/2000 | Ford | |
| 7,587,790 B2 | | 9/2009 | McCue et al. | |
| 8,141,316 B2 | * | 3/2012 | Remin | E04F 19/00 52/631 |
| 8,430,253 B1 | * | 4/2013 | Jackson | A47B 97/00 211/90.03 |
| 8,573,134 B2 | | 11/2013 | Brenner | |

(Continued)

FOREIGN PATENT DOCUMENTS

| | | | |
|---|---|---|---|
| DE | 102009049364 | * | 4/2011 |
| DE | 102020005284 | * | 11/2020 |

(Continued)

*Primary Examiner* — Janet M Wilkens

(57) ABSTRACT

A flexible shelf guard for securing items or products in a shelf of a recreational vehicle is disclosed. The shelf guard is designed with a first section and a second section. The first section and the second section are molded to a middle section using a two-shot molding process, thereby producing the shelf guard. The shelf guard is securely and removably affixed to a top portion of the shelf by inwardly folding both end portions of the first section and the second section. The shelf guard comprises a holder and a drainer. The holder is molded to a front portion of the middle section of the shelf guard using any molding process. The drainer is configured to drain fluid/water within the shelf, thereby preventing the growth of molds and microorganisms by maintaining a dry environment within the shelf.

8 Claims, 8 Drawing Sheets

(56) References Cited

U.S. PATENT DOCUMENTS

| | | | |
|---|---|---|---|
| 8,807,408 B2* | 8/2014 | Kreis | B60R 7/04 |
| | | | 224/567 |
| D730,080 S | 5/2015 | Henn | |
| 9,642,435 B2* | 5/2017 | Clements | A45D 27/22 |
| D833,174 S | 11/2018 | Belokin | |
| 10,363,878 B1* | 7/2019 | Lee | B60R 7/046 |
| 11,292,394 B2* | 4/2022 | Takashi | B60R 7/08 |
| 2001/0031351 A1* | 10/2001 | Rood | B60J 10/00 |
| | | | 428/318.6 |
| 2008/0290055 A1 | 11/2008 | Perkovich | |
| 2009/0001748 A1* | 1/2009 | Brown | B60R 7/005 |
| | | | 296/37.8 |
| 2010/0325904 A1* | 12/2010 | West | A45D 34/06 |
| | | | 30/541 |
| 2011/0258768 A1* | 10/2011 | Spingola | A47K 3/302 |
| | | | 4/559 |
| 2012/0199048 A1* | 8/2012 | Savalas | D06F 39/12 |
| | | | 29/428 |
| 2016/0242573 A1 | 8/2016 | Colelman | |
| 2017/0224114 A1* | 8/2017 | Moore | A47B 96/025 |

FOREIGN PATENT DOCUMENTS

| | | | |
|---|---|---|---|
| JP | 01154715 | * | 6/1989 |
| JP | 2002038736 | * | 2/2020 |
| WO | 2020182382 | * | 9/2020 |

* cited by examiner

FLEXIBLE SHELF GUARD FOR RECREATIONAL VEHICLES

BACKGROUND OF THE INVENTION

A. Technical Field

The present invention generally relates to a retaining device for securing items or products, which are stored generally on a corner shelf. More specifically, the present invention relates to a flexible shelf guard for securing items or products in a shelf of a recreational vehicle such as, but not limited to, campers, caravans, travel trailers, motor homes, boats, airplanes, and generally any moving vehicles.

B. Description of Related Art

Today, people are commuting longer distances and spending more time in their recreational vehicles than ever before. The recreational vehicles, such as campers, caravans, travel trailers, motor homes, or the like are relatively large compared to a normal vehicle and generally offer quite confined living spaces for the occupants. The recreational vehicles are provided with different storage compartments and shelves for storing items and products. The storage compartments and shelves vary in size and shape. However, the items and products are not secured, which are stored within the storage compartments and the shelves of the recreational vehicles. In addition, accidents or movements of the recreational vehicle often cause items, which are transporting to a temporary location to be knocked off of an edge of the shelves of the recreational vehicle.

Items are often stored on flat surfaces near edges of the shelves. Unfortunately, such items often fall off of these edges when these surface areas of the shelves are too small and/or when they have too many items placed upon them. It is well known that this will then often lead to fall items and break or spill its contents. Expensive and/or hard to replace items may fall and break, or a container of pills may spill onto the floor, all of which could be very frustrating, especially after repeated incidents.

A prior art U.S. Pat. No. 8,573,134 to Brenner Michael, describes about a transparent shelf guard. The transparent shelf guard includes a protective member with an inner-facing surface and a mounting member inner-facing surface that are both made from a transparent and rigid material, such as plastic or acrylic. The mounting member's inner-facing surface includes an adhesive strip or double-sided tape to secure the transparent shelf guard.

Another prior art US20160242573 to Sean Christopher Colelman, describes about a shelf management device for organizing products on a retail shelf having a display surface and perforations. Shelf management device used to organize and secure merchandise on a retail shelf, and it also comprises a unitary structure having a horizontal base panel attached to a vertical partition. The shelf management device comprises a unitary or monolithic structure constructed of plastic formed from either injection molding, or a vacuum or thermal forming process. It is foreseen that the device may also be formed as separate parts and assembled. The durable and lightweight materials other than plastic may also be used, such as rubber or aluminum, Plastic is preferable because it can be made of translucent or colored depending on the needs of the end-user.

However, conventional devices and methods are inconvenient, expensive, and impractical. The conventional devices require additional equipment and fasteners for assembling, thereby increasing installation cost. Further, the conventional devices do not maintain a dry environment within the shelves, thereby forming molds, bacteria, and other microorganisms within the shelves. Further, the conventional devices do not match up with the existing shelves.

Therefore, there is a need to provide a flexible shelf guard that provides a secure boundary for the edge of the shelf in order to prevent items and products from being knocked off in any direction. There is a need to provide a flexible shelf guard that could be adapted to many different systems. Further, there is a need to provide an inexpensive, durable, and flexible shelf guard that could be easily and removably assembled on the edge of the shelf for securing the items and products and maintaining an upright position on the shelf of the recreational vehicle.

SUMMARY OF THE INVENTION

The present invention discloses a retaining device for securing items or products, which are stored on a shelf. Further, the present invention generally discloses a flexible shelf guard for securing items or products in a corner shelf inside a recreational vehicle such as, but not limited to, campers, caravans, travel trailers, motor homes, boats, airplanes, and generally any moving vehicles.

In some embodiments, the flexible shelf guard is designed with a first section and a second section. In some embodiments, the first section and the second section have pre-determined dimensions. In some embodiments, the first section and the second section are molded to a middle section using, but not limited to, a molding process, thereby producing the shelf guard with the pre-determined dimensions. In one embodiment, the molding process is at least any one of a single-shot molding process and a two-shot molding process. In some embodiments, the shelf guard could be produced using, but not limited to, an injection molding process and a thermoforming process. In another embodiment, the first section and the second section are molded to a middle section using a two-shot molding process, thereby producing the shelf guard with the pre-determined dimensions. In some embodiments, the shelf guard is configured to secure items and products on the shelf of a recreational vehicle such as, but not limited to, campers, caravans, travel trailers, motor homes, boats, airplanes, and generally any moving vehicles. The shelf guard could secure the items and products, which are transferring to a temporary location by placing on the shelf of the recreational vehicle. In some embodiments, the shelf guard could be securely affixed to shelves in, but not limited to, homes, offices, restrooms, institutions, and thereof. In another embodiment, the shelf guard could be molded as a single unitary piece using a material includes, but not limited to, flexible plastic, thermoplastic elastomer (TPE), and polypropylene (PP). In one embodiment, the shelf guard is configured to securely and removably affixed to a top portion of the shelf in a vertical position by inwardly folding both end portions of the first section and the second section. In some embodiments, an adhesive material is fastened to both end portions of the first section and the second section for securely fastening the shelf guard to the shelf of the recreational vehicle. In an exemplary embodiment, the adhesive material could be, but not limited to, a double-sided tape that is coated with an adhesive on both sides.

In some embodiments, the first section and the second section of the shelf guard are uniformly overlapped at both end sections of the middle section. In some embodiments, the first section and the second section are uniformly overlapped and securely joined at both end portions of the middle section by use of lap-joints. The first section and the second section act as flexible hinge sections for securely connecting to a top portion of the shelf. In one embodiment, the first section and the second section are made of a material includes, but not limited to, flexible plastic and a thermoplastic elastomer (TPE). In some embodiments, the first section and the second section are made of a flexible material. In one embodiment, the middle section of the shelf guard is made of a material includes, but not limited to, polypropylene (PP) and hard plastic. In some embodiments, the middle section could be made of, but not limited to, a transparent material. In one embodiment, the dimensions of the first section and the second section could be varied according to the system and the size of the shelves. In one embodiment, the dimensions of the middle section could be varied according to the system and the size of the shelves.

In one embodiment, the shelf guard comprises a holder. In one embodiment, the holder could be molded at, but not limited to, the front portion or the middle portion of the shelf guard using any molding process includes, but not limited to, a single shot molding process or a two-shot molding process. In some embodiments, the holder is securely and removably affixed to a front portion of the middle section of the shelf guard using any adhesive material. In some embodiments, the holder is securely and removably affixed to, but not limited to, a front portion of the shelf guard using any adhesive material. In one embodiment, the holder is configured to securely and retainably hold one or more items or products include, but not limited to, a brush, a razor, and thereof.

In one embodiment, an assembly of the shelf guard is disclosed. In one embodiment, the user could simply and securely fasten the shelf guard to a top portion of the shelf in a vertical position by inwardly folding both end portions of the first section and the second section of the shelf guard. In some embodiments, the shelf guard is configured to securely fastened to a top portion of the shelf in a vertical position by a user using an adhesive material. In one embodiment, the adhesive material is fastened to both end portions of the first section and the second section for securely fastening to the shelf of the recreational vehicle. In one embodiment, the shelf guard could be securely affixed to any other shelves in, but not limited to, homes, offices, restrooms, institutions, and thereof. In one embodiment, the dimensions of the shelf guard could be varied according to the sizes of the shelves.

In one embodiment, the shelf guard further comprises a drainer. The drainer is securely affixed to a bottom portion of the shelf guard. In one embodiment, the drainer is configured to drain fluid/water within the shelf, thereby preventing the growth of molds and microorganisms by maintaining a dry environment within the shelf. In one embodiment, the drainer could be, but not limited to, teeth shaped flaps for the fluid/water to drain out from the shelves.

In another embodiment, the shelf guard could be molded as a single unitary piece using a flexible material includes, but not limited to, flexible plastic, thermoplastic elastomer (TPE), and polypropylene (PP). In another embodiment, the shelf guard includes at least, but not limited to, 5 sections such as a middle section, two thin sections, and end sections. In one embodiment, the end sections of the shelf guard are made of, but not limited to, polypropylene (PP) material. In another embodiment, the shelf guard is securely and removably affixed to a top portion of the shelf of the recreational vehicle by inwardly folding both end sections of the shelf guard. In one embodiment, the end sections could provide good adhesion for firmly securing the shelf guard to the top portion of the shelf.

In yet another embodiment, the shelf guard includes a middle section, flexible sections/bendable section and end sections on both end portions. The flexible sections could enable a user to bend or twist in a direction for simply installing the shelf guard at the top portion of the shelf of the recreational vehicle. In one embodiment, the flexible sections include a plurality of flexible members. In another embodiment, the shelf guard is made of, but not limited to, hard plastic similar to polypropylene (PP) using the single-shot molding process. In another embodiment, the both end sections and middle section are made of, but not limited to, hard plastic similar to polypropylene (PP) to provide good adhesion for firmly securing the shelf guard to the top portion of the shelf and the flexible sections are made of, but not limited to, thermoplastic elastomer (TPE) using the two-shot molding process.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
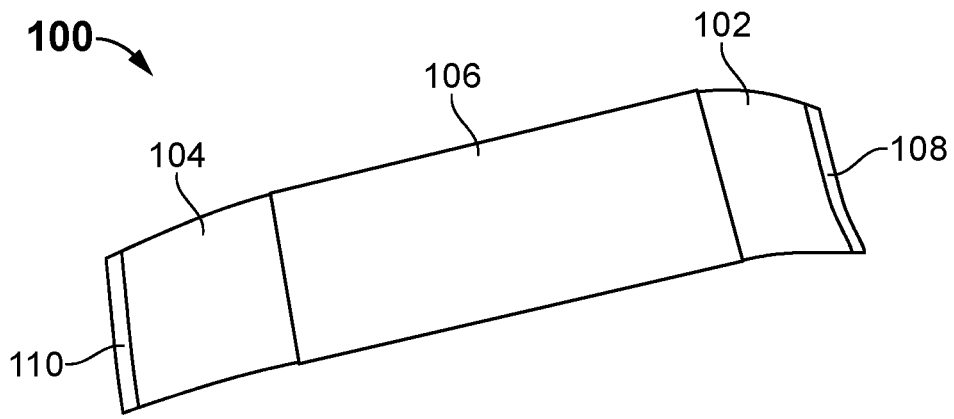
FIG. 1 shows a front perspective view of a flexible shelf guard used for securing items and products on a shelf of a recreational vehicle in an embodiment of the present invention.

Referring to FIG. 1, a flexible shelf guard 100 used for securing items and products on a shelf 101 (shown in FIG. 5) of a recreational vehicle is disclosed. In one embodiment, the shelf guard 100 could be designed with a first section 102 and a second section 104. In one embodiment, the first section 102 and the second section 104 have pre-determined dimensions. In one embodiment, the first section 102 and second section 104 are molded to a middle section 106 using, but not limited to, a molding process, thereby producing the shelf guard 100 with the pre-determined dimensions. In one embodiment, the molding process is at least any one of a single-shot molding process and a two-shot molding process. In some embodiments, the shelf guard 100 could be produced using, but not limited to, an injection molding process and a thermoforming process. In another embodiment, the first section 102 and the second section 104 are molded to a middle section 106 using a two-shot molding process, thereby producing the shelf guard 100 with the pre-determined dimensions. In one embodiment, the shelf guard 100 is configured to secure items and products on the shelf 101 of a recreational vehicle such as, but not limited to, campers, caravans, travel trailers, motor homes, boats, airplanes, and generally any moving vehicles. The shelf guard 100 could secure the items and products, which are transferring to a temporary location by placing on the shelf 101 of the recreational vehicle. In some embodiments, the shelf guard 100 could be securely affixed to shelves in, but not limited to, homes, offices, restrooms, institutions, and thereof. In another embodiment, the shelf guard 100 could be molded as a single unitary piece using a flexible material includes, but not limited to, flexible plastic, thermoplastic elastomer (TPE), and polypropylene (PP). In one embodiment, the shelf guard 100 is configured to securely and removably affixed to a top portion of the shelf 101 in a vertical position by inwardly folding both end portions of the first section and the second section. In an exemplary embodiment, an adhesive material (108 and 110) is fastened to both end portions of the first section 102 and the second section 104 for securely fastening the shelf guard 100 to the shelf 101 of the recreational vehicle. In an exemplary embodiment, the adhesive material (108 and 110) could be, but not limited to, a double-sided tape that is coated with an adhesive on both sides. In some embodiments, the adhesive material (108 and 110) could be, but not limited to, polypropylene (PP), which is molded to both end portions of the first section 102 and the second section 104 of the shelf guard 100. Further, an adhesive or a double-sided tape is added to the adhesive material (108 and 110) for securely fastening the shelf guard 100 to the shelf 101 of the recreational vehicle.

Figure 2:
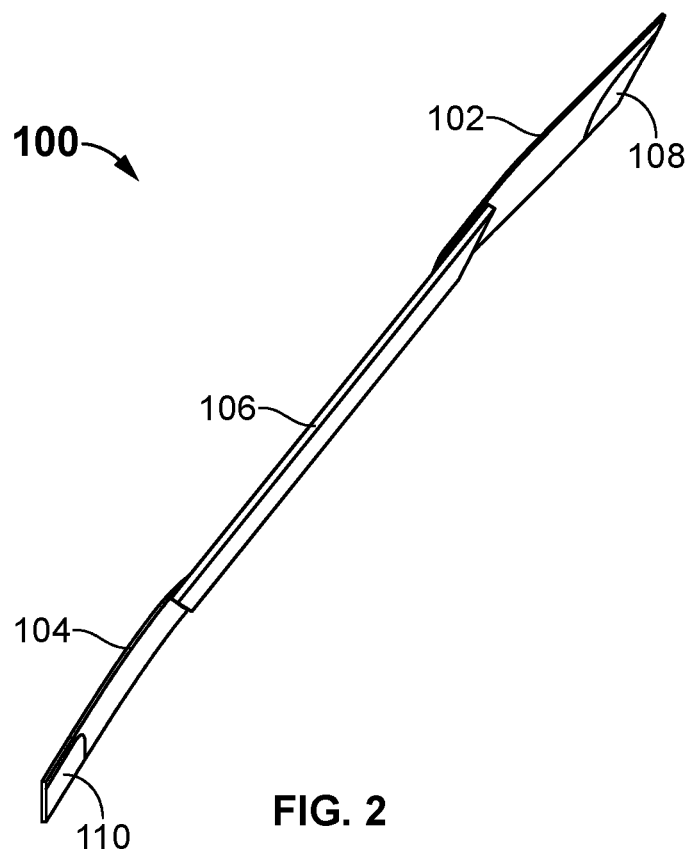
FIGS. 2-3 shows a side perspective view of a first section and a second section of the flexible shelf guard are uniformly overlapped at both end sections of the middle section in one embodiment of the present invention.
Figure 3:
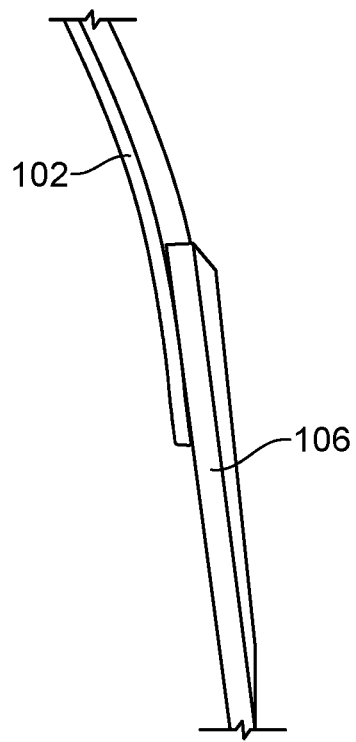

Referring to FIGS. 2-3, the first section 102 and the second section 104 of the shelf guard 100 are uniformly overlapped at both end sections of the middle section 106 is disclosed. In one embodiment, the first section 102 and the second section 104 are uniformly overlapped and securely joined at both end portions of the middle section 106 by use of lap-joints. The first section 102 and the second section 104 act as flexible hinge sections for securely connecting to a top portion of the shelf 101. In one embodiment, the first section 102 and the second section 104 are made of a material includes, but not limited to, flexible plastic and a thermoplastic elastomer (TPE). In some embodiments, the first section 102 and the second section 104 are made of a flexible material. In one embodiment, the middle section 106 of the shelf guard 100 is made of a material includes, but not limited to, polypropylene (PP) and hard plastic. In some embodiments, the middle section 106 could be made of a transparent material. In one embodiment, the dimensions of the first section 102 and the second section 104 could be varied according to the system and size of the shelves. In one embodiment, the dimensions of the middle section 106 could be varied according to the system and the size of the shelves.

In another embodiment, the shelf guard 100 could be molded as a single unitary piece using a flexible material includes, but not limited to, flexible plastic, thermoplastic elastomer (TPE), and polypropylene (PP). In another embodiment, the first section 102 and the second section 104 could be flexible thinner sections.

Figure 4:
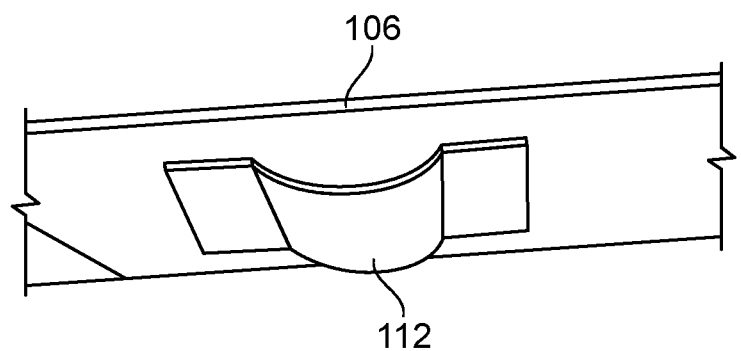
FIG. 4 shows a perspective view of a holder of the flexible shelf guard in one embodiment of the present invention.

Referring to FIG. 4, a holder 112 of the shelf guard 100 is disclosed. In one embodiment, the shelf guard 100 comprises the holder 112. In one embodiment, the holder 112 is molded at the front portion of the shelf guard 100. In some embodiments, the holder 112 is securely and removably affixed to a front portion of the middle section 106 of the shelf guard 100 using any adhesive material. In some embodiments, the holder 112 is securely and removably affixed to, but not limited to, a front portion of the shelf guard 100 using any adhesive material. In one embodiment, the holder 112 is configured to securely and retainably hold one or more items or products include, but not limited to, a brush, a razor, and thereof. In some embodiments, the holder 112 could be molded at, but not limited to, the front portion or the middle portion of the shelf guard 100 using any molding process includes, but not limited to, a single shot molding process or a two-shot molding process.

Figure 5:
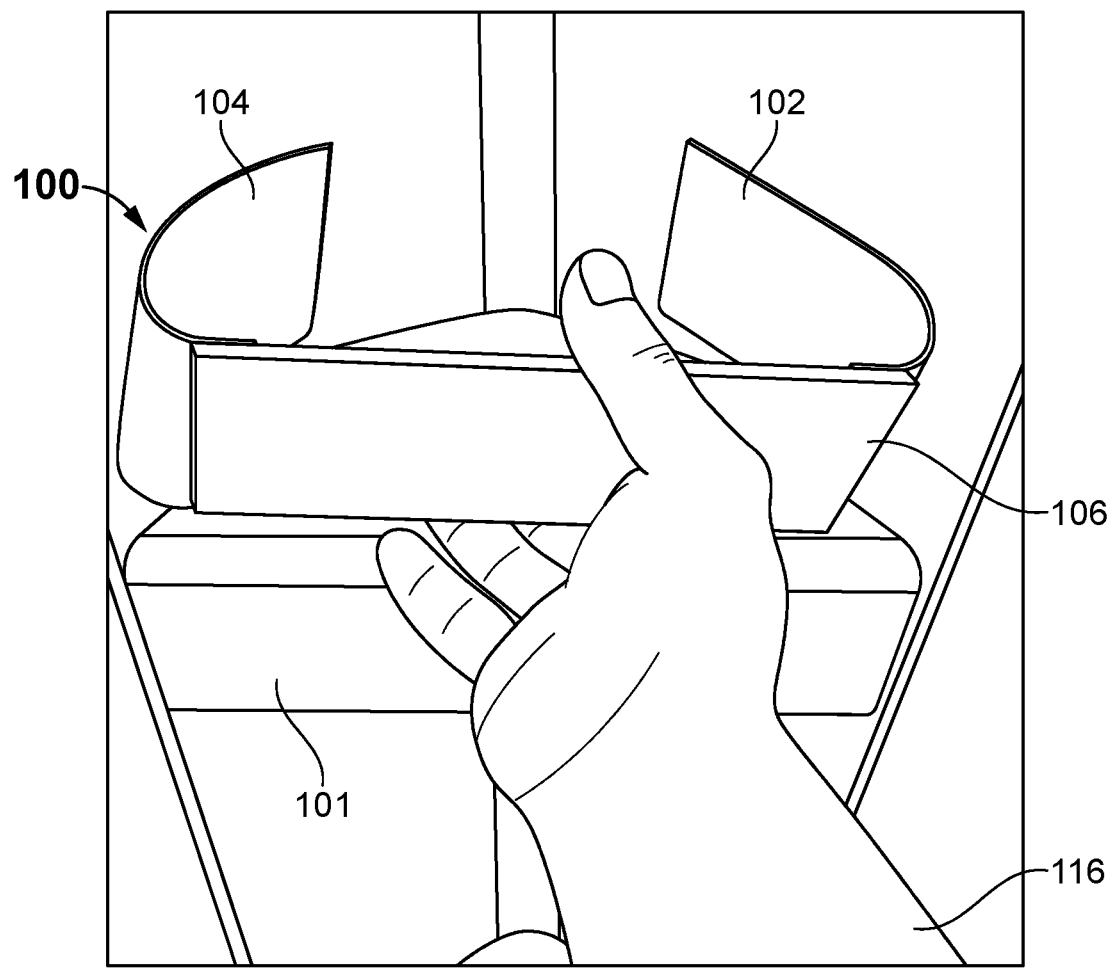
FIG. 5 shows a perspective view of an assembly of the flexible shelf guard in one embodiment of the present invention.

Referring to FIG. 5, an assembly of the shelf guard 100 is disclosed. In one embodiment, the shelf guard 100 is configured to securely and removably affixed to a top portion of the shelf 101 in a vertical position by a user 116. In one embodiment, the user 116 could simply and securely fasten the shelf guard 100 to a top portion of the shelf 101 in a vertical position by inwardly folding both end portions of the first section 102 and the second section 104 of the shelf guard 100. In an exemplary embodiment, the adhesive material (108 and 110) (shown in FIG. 1) is used to fasten both end portions of the first section 102 and the second section 104 of the shelf guard 100 for securely fastening to the shelf 101 of the recreational vehicle. In one embodiment, the shelf guard 100 could be securely affixed to any other shelves in, but not limited to, homes, offices, restrooms, institutions, and thereof. In one embodiment, the dimensions of the shelf guard 100 could be varied according to the sizes of the shelves.

Figure 6:
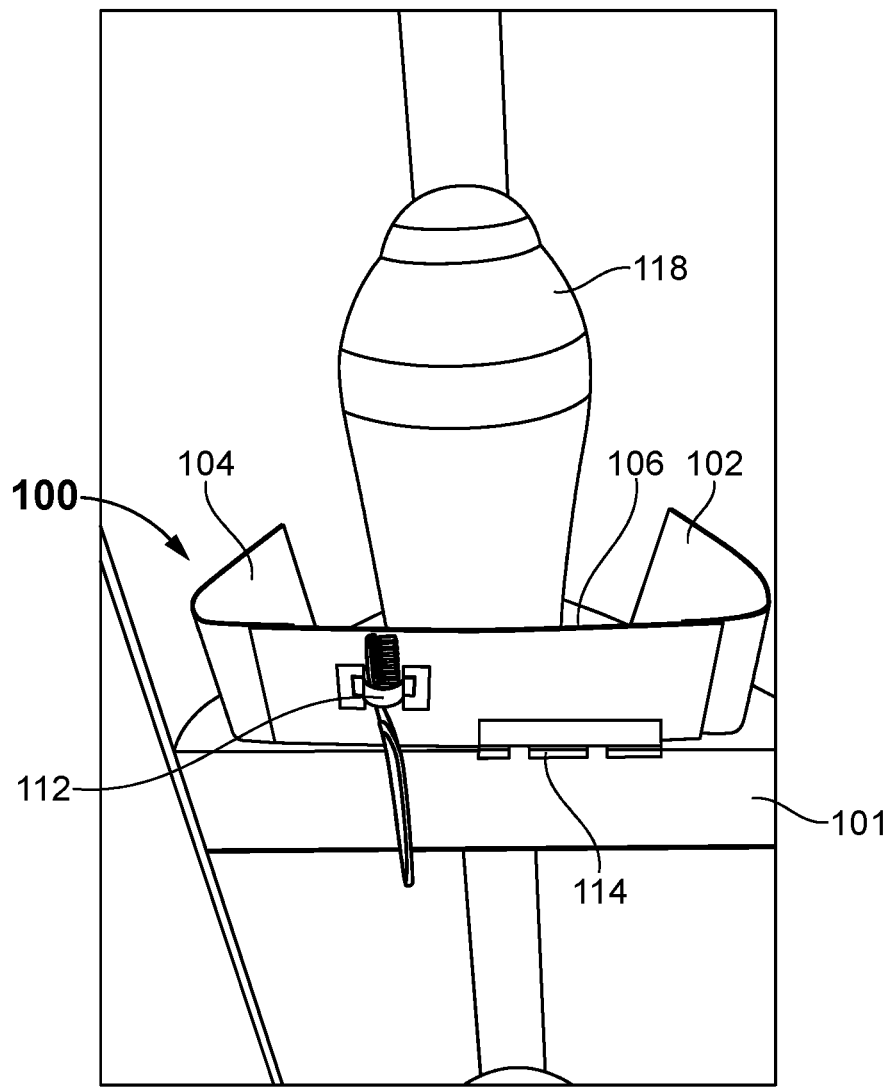
FIG. 6 shows a front perspective view of the flexible shelf guard provided with a holder and a drainer in one embodiment of the present invention.

Referring to FIG. 6, the shelf guard 100 used for securing the items and the products, for example, a bottle 118 within the shelf 101 of the recreational vehicle is disclosed. In an exemplary embodiment, the shelf guard 100 could secure the bottle 118 within the shelf 101. In one embodiment, the holder 112 could be molded at, but not limited to, the front portion or the middle portion of the shelf guard 100 using any molding process for securely holding items and products such as, but not limited to, a brush and razor. In some embodiments, the holder 112 is securely and removably affixed to the middle section 106 of the shelf guard 100 for securely holding items and products such as, but not limited to, a brush and razor. In one embodiment, the shelf guard 100 further comprises a drainer 114. The drainer 114 is securely affixed to a bottom portion of the shelf guard 100.

In one embodiment, the drainer 114 is configured to drain fluid/water within the shelf, thereby preventing the growth of molds and microorganisms by maintaining a dry environment within the shelf. In one embodiment, the drainer 114 could be, but not limited to, teeth shaped flaps for the fluid/water to drain out from the shelves. In some embodiments, the drainer 114 could be molded in at the bottom portion of the shelf guard 100.

Figure 7:
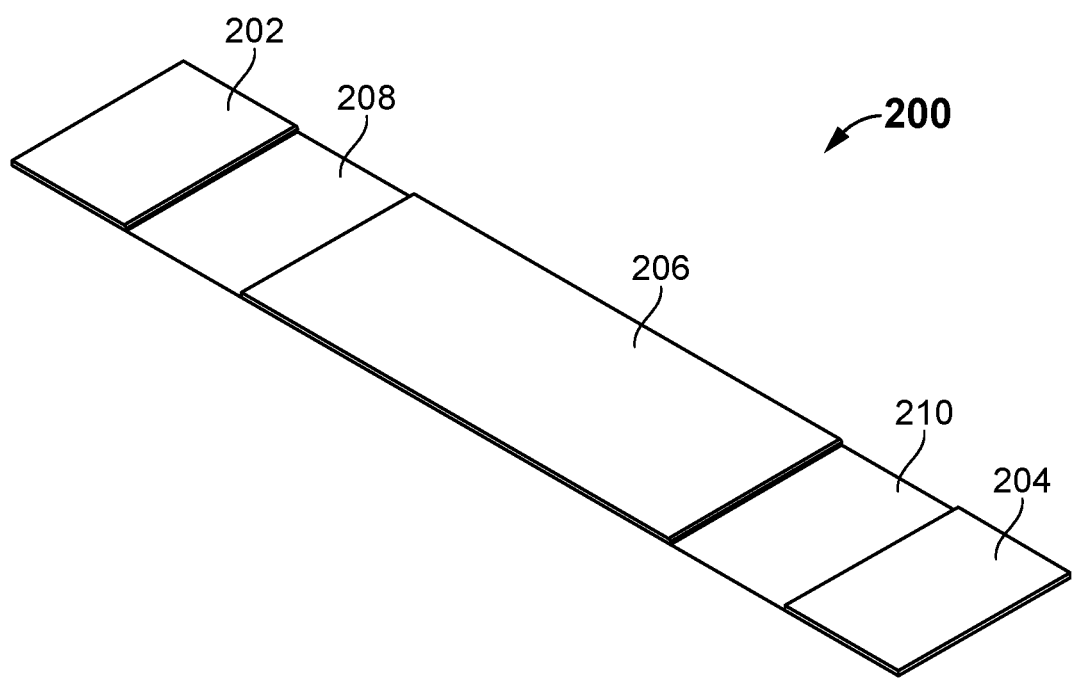
FIG. 7 shows a rear perspective view of the flexible shelf guard in another embodiment of the present invention.
Figure 8:
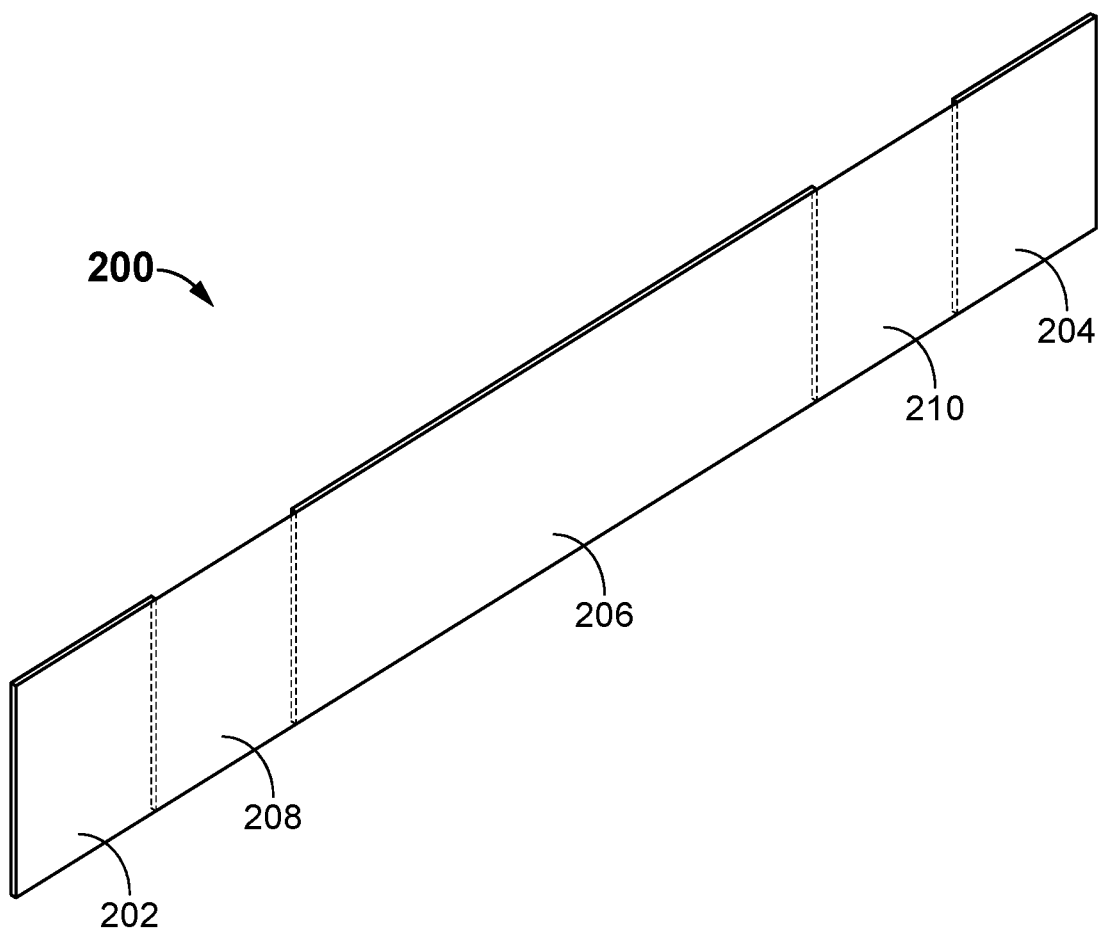
FIG. 8 shows a front perspective view of the flexible shelf guard in another embodiment of the present invention.

Referring to FIGS. 7-8, a flexible shelf guard 200 used for securing the items and the products within the shelf 101 of the recreational vehicle is disclosed. In another embodiment, the shelf guard 200 is molded as a single unitary piece using a molding process. In one embodiment, the molding process could be, but not limited to, an injection molding process, a single-shot molding process, and a thermoforming process. In one embodiment, the shelf guard 200 is made of a flexible material includes, but not limited to, flexible plastic, thermoplastic elastomer (TPE), and polypropylene (PP).

In one embodiment, the shelf guard 200 includes at least, but not limited to, 5 sections such as a middle section 206, two thin sections (208 and 210), and end sections (202 and 204). In one embodiment, the end sections (202 and 204) of the shelf guard 200 are made of, but not limited to, polypropylene (PP) material. In one embodiment, the shelf guard 200 is securely and removably affixed to a top portion of the shelf 101 of the recreational vehicle by inwardly folding both end sections (202 and 204) of the shelf guard 200. In one embodiment, the end sections (202 and 204) could provide good adhesion for firmly securing the shelf guard 200 to the top portion of the shelf 101.

Figure 9:
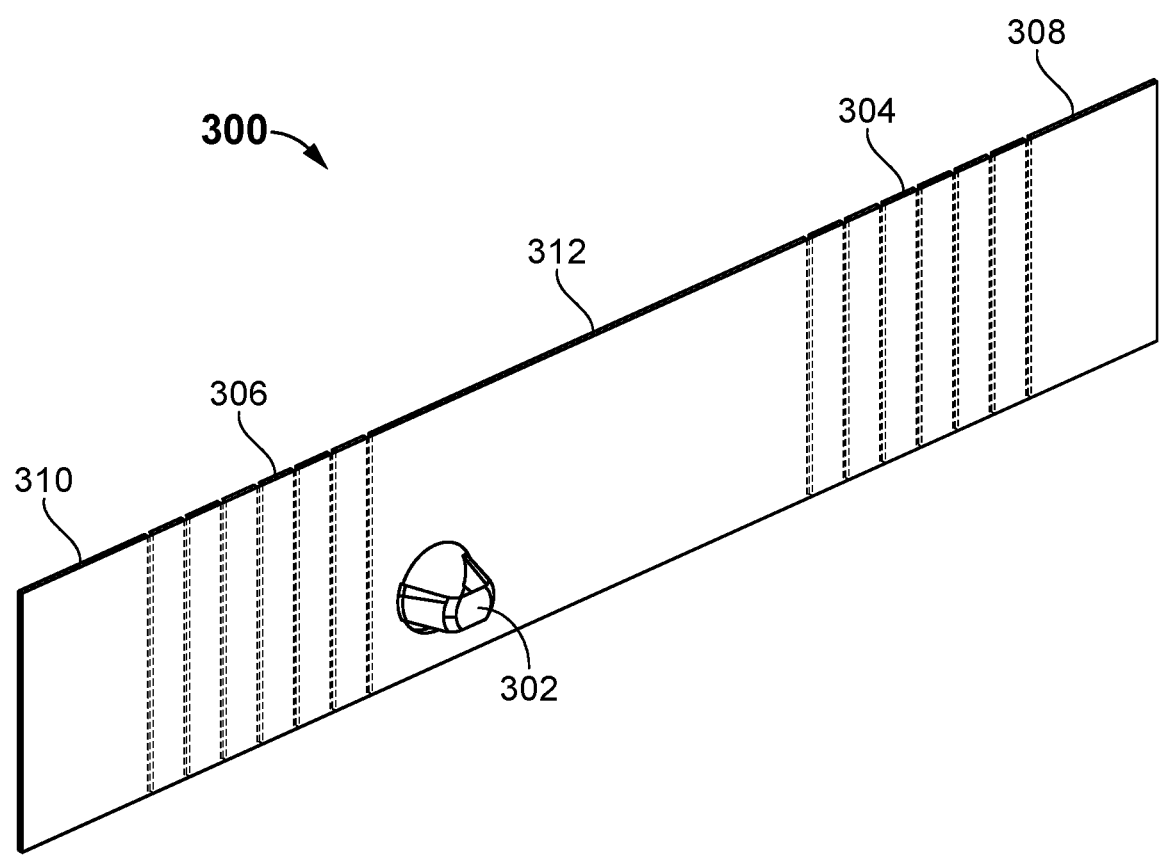
FIG. 9 shows a front perspective view of the flexible shelf guard in yet another embodiment of the present invention.
Figure 10:
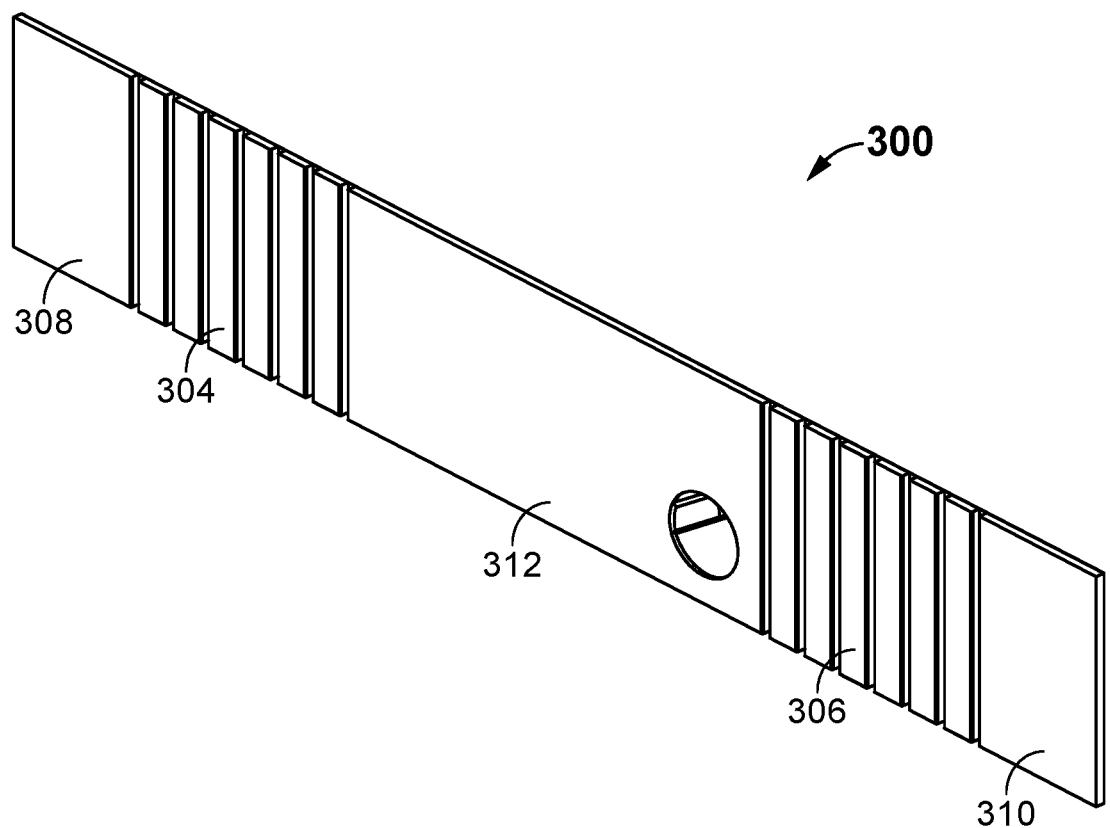
FIG. 10 shows a rear perspective view of the flexible shelf guard in another embodiment of the present invention.

Referring to FIGS. 9-10, a flexible shelf guard 300 used for securing the items and the products within the shelf 101 of the recreational vehicle is disclosed. In another embodiment, the shelf guard 300 is molded as a single unitary piece using a molding process. In one embodiment, the molding process could be, but not limited to, an injection molding process, a single-shot molding process, and a thermoforming process. In one embodiment, the shelf guard 300 is made of a flexible material includes, but not limited to, flexible plastic, thermoplastic elastomer (TPE), and polypropylene (PP).

In one embodiment, the shelf guard 300 is made of, but not limited to, hard plastic similar to polypropylene (PP) using the single-shot molding process. In another embodiment, the both end sections (308 and 310) and middle section 312 are made of, but not limited to, hard plastic similar to polypropylene (PP) to provide good adhesion for firmly securing the shelf guard 300 to the top portion of the shelf 101 and the flexible sections (304 and 306) are made of, but not limited to, thermoplastic elastomer (TPE) using the two-shot molding process.

In one embodiment, the shelf guard 300 comprises a holder 302. In one embodiment, the holder 302 is molded at a front side of the shelf guard 300 using any molding process. In one embodiment, the shelf guard 300 includes a middle section 312, flexible sections (304 and 306) and end sections (308 and 310) on both end portions, respectively. The flexible sections (304 and 306) could enable a user to bend or twist in a direction for simply installing the shelf guard 300 at the top portion of the shelf 101 of the recreational vehicle. In one embodiment, the flexible sections (304 and 306) include a plurality of flexible members. In one embodiment, end sections (308 and 310) are configured to firmly hold and secure the shelf guard 300 to the top portion of the shelf 101. In one embodiment, the drainer 114 could be securely affixed to a bottom portion of the flexible shelf guard 300, wherein the drainer 114 is configured to drain fluid/water within the shelf 101, thereby preventing the growth of molds and microorganisms by maintaining a dry environment within the shelf 101 of the recreational vehicle.

The advantages of the present invention include, the shelf guard 100 could enable the user 116 to simply fasten to the shelf 101 in a vertical position by inwardly folding both end portions of the first section 102 and the second section 104 and fastening to the shelf 101. The shelf guard 100 is inexpensive, flexible, reliable, and could be easily mounted on the shelf 101 of the recreation vehicles such as, but not limited to, campers, caravans, travel trailers, motor homes, boats, airplanes, and generally any moving vehicles. The shelf guard 100 could prevent the items and products from accidentally falling off the shelf 101 and keep the items and products in an upright position. The shelf guard 100 could be adapted to many different systems and shelves. The shelf guard 100 could enable the user 116 to simply access the items and products stored within the shelf 101 of the recreational vehicle.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A flexible shelf guard for securing items and products on a shelf inside a recreational vehicle, comprising:
   a first section and a second section having pre-determined dimensions, wherein the first section and the second section are molded to a middle section using a molding process, thereby producing the flexible shelf guard with the pre-determined dimensions, configured to securely and removably affixed to a top portion of the shelf in a vertical position by inwardly folding both end portions of the first section and the second section, wherein the middle section of the flexible shelf guard is made of polypropylene (PP), and the first section and the second section are made of thermoplastic elastomer (TPE),
   a drainer securely affixed to a bottom portion of the flexible shelf guard, wherein the drainer comprises a plurality of teeth for allowing the fluid/water to drain out off the shelf, thereby preventing the growth of molds and microorganisms by maintaining a dry environment within the shelf of the recreational vehicle, and
   a holder, securely and removably positioned on a front portion of the flexible shelf guard, and the holder is configured to securely and retainably hold one or more items include a brush and a razor.

2. The flexible shelf guard of claim 1, is configured to secure the items and the products, which are stored on the shelf of the recreational vehicle.

3. The flexible shelf guard of claim 1, wherein the molding process is at least any one of a single shot molding process and a two-shot molding process.

4. A flexible shelf guard for securing items and products on a shelf, comprising:
   a first section and a second section having pre-determined dimensions, wherein the first section and the second section are molded to a middle section using a two-shot molding process, thereby producing the flexible shelf guard with the pre-determined dimensions, wherein the flexible shelf guard is configured to securely and removably affixed to a top portion of the shelf in a vertical position by inwardly folding both end portions of the first section and the second section, wherein the middle section of the flexible shelf guard is made of polypropylene (PP), and the first section and the second section are made of thermoplastic elastomer (TPE), and
   a drainer securely affixed to a bottom portion of the flexible shelf guard, wherein the drainer comprises a plurality of teeth for allowing the fluid/water to drain out off the shelf, thereby preventing the growth of molds and microorganisms by maintaining a dry environment within the shelf of the recreational vehicle, and
   a holder, securely and removably positioned on a front portion of the flexible shelf guard, and the holder is configured to securely and retainably hold one or more items include a brush and a razor.

5. The flexible shelf guard of claim 4, is configured to secure the items and the products, which are stored on the shelf of the recreational vehicle.

6. A flexible shelf guard for securing items and products on a shelf inside a recreational vehicle, comprising:
   at least five sections molded as a single unitary piece using a molding process, wherein the middle section of the flexible shelf guard is made of polypropylene (PP), and the first section and the second section are made of thermoplastic elastomer (TPE),
   wherein the flexible shelf guard is configured to securely and removably affix to a top portion of the shelf of the recreational vehicle in a vertical position by inwardly folding both end sections of the flexible shelf guard,
   a drainer securely affixed to a bottom portion of the flexible shelf guard, wherein the drainer comprises a plurality of teeth for allowing the fluid/water to drain out off the shelf, thereby preventing the growth of molds and microorganisms by maintaining a dry environment within the shelf of the recreational vehicle, and
   a holder, securely and removably positioned on a front portion of the flexible shelf guard, and the holder is configured to securely and retainably hold one or more items include a brush and a razor.

7. The flexible shelf guard of claim 6, is further configured to secure the items and the products, which are stored on the shelf of the recreational vehicle.

8. The flexible shelf guard of claim 6, wherein the molding process is at least any one of a single shot molding process and a two-shot molding process.

* * * * *